United States Patent [19]

Collinucci

[11] 3,980,010

[45] Sept. 14, 1976

[54] COOKING SPIT

[76] Inventor: Luigi Collinucci, 12, Rue Crespin, 1206 Geneva, Switzerland

[22] Filed: Sept. 19, 1975

[21] Appl. No.: 614,949

Related U.S. Application Data

[63] Continuation-in-part of Ser. No. 506,950, Sept. 18, 1974, abandoned.

[30] Foreign Application Priority Data

July 28, 1975 Switzerland.......................... 9806/75

[52] U.S. Cl.............................. 99/421 H; 219/523
[51] Int. Cl.². ........................................ A47J 37/04
[58] Field of Search......... 99/419, 420, 421–421 TP, 99/358, 442; 219/435, 436, 388, 441–523

[56] References Cited
UNITED STATES PATENTS

| | | | |
|---|---|---|---|
| 1,902,564 | 3/1933 | Mabey................................. | 99/419 |
| 2,918,561 | 12/1959 | Perez.................................. | 219/523 |
| 3,090,235 | 5/1963 | Houser............................ | 99/421 TP |
| 3,171,015 | 2/1965 | Grinde.............................. | 219/523 X |
| 3,546,431 | 12/1970 | Gibbs............................... | 219/523 X |
| 3,709,141 | 1/1973 | Schwartzstein................... | 99/419 X |
| 3,899,657 | 8/1975 | Johnson............................ | 99/419 X |

FOREIGN PATENTS OR APPLICATIONS

| | | | |
|---|---|---|---|
| 217,592 | 3/1961 | Austria................................ | 99/419 |
| 1,482,608 | 4/1967 | France................................ | 99/419 |

*Primary Examiner*—Stanley N. Gilreath
*Assistant Examiner*—Arthur O. Henderson
*Attorney, Agent, or Firm*—Robert E. Burns; Emmanuel J. Lobato; Bruce L. Adams

[57] ABSTRACT

A cooking spit has an insulating handle carrying a rod with electrically heated end parts disposed about a central part about which an open-ended tubular sleeve is removably fitted. The central sleeve supports a fowl for internal cooking by heat conduction through the central part and external cooking by air circulation, and simultaneously prevents grease and juice from dripping on the heated rod. The spit may be integral with a lateral cover of a cooking enclosure, or can be used in a dish with removable cover.

8 Claims, 6 Drawing Figures

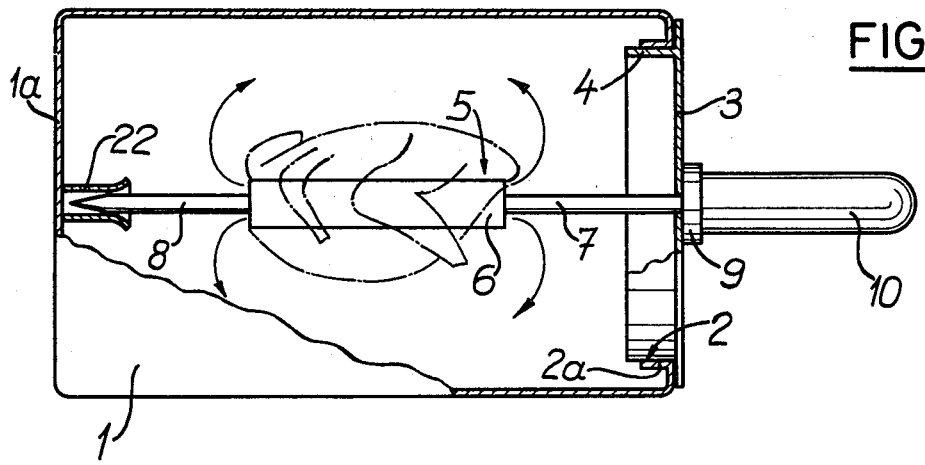
FIG. 1
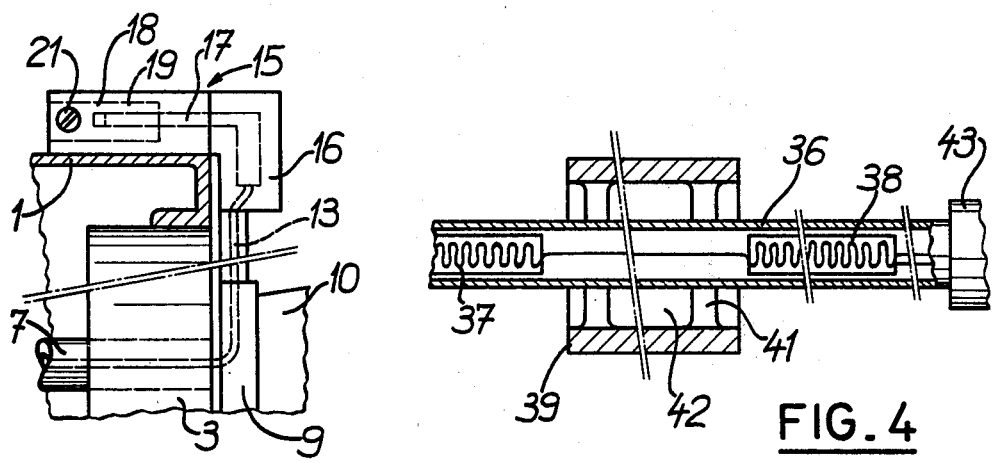
FIG. 2
FIG. 4
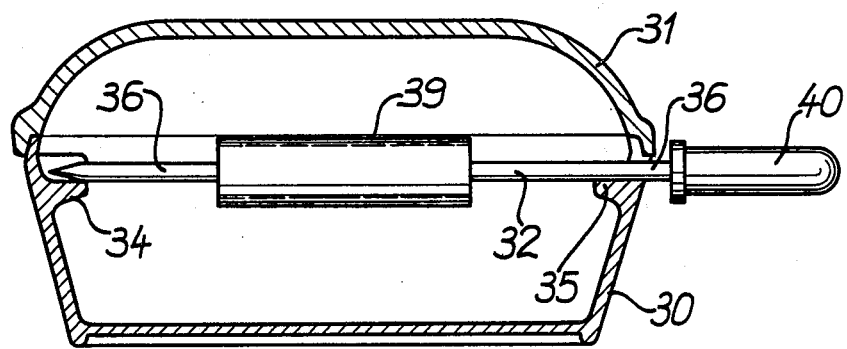
FIG. 3

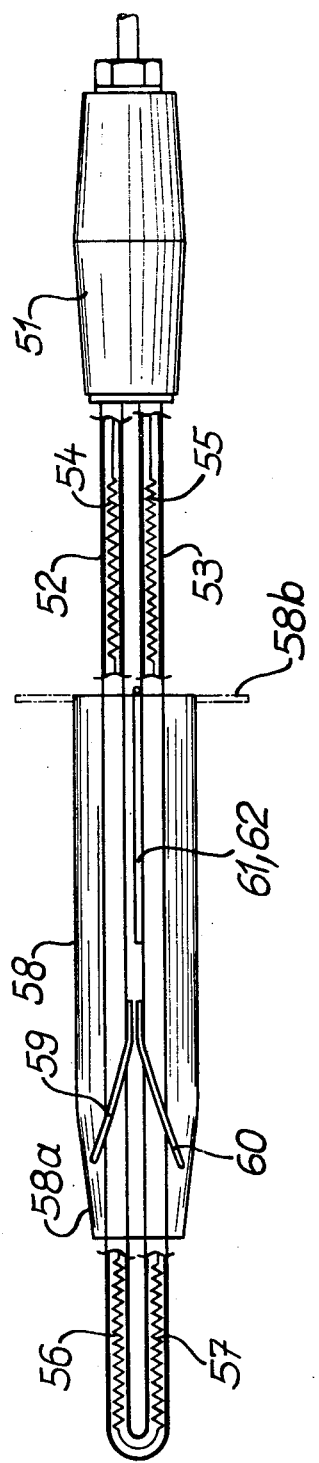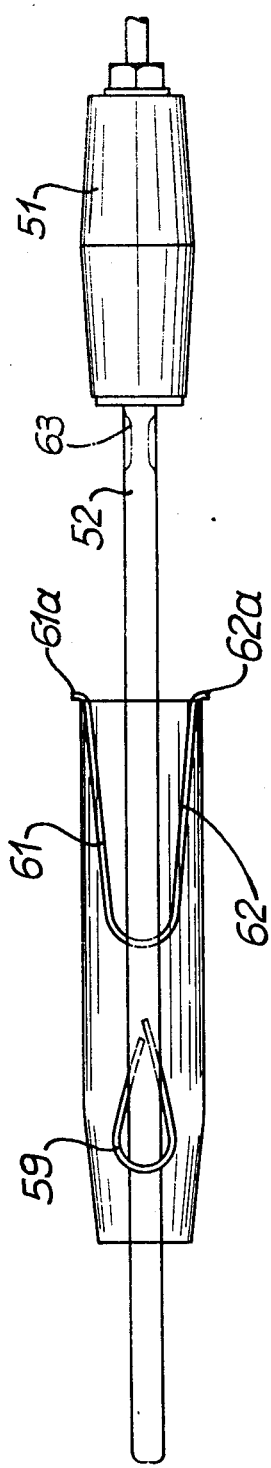

COOKING SPIT

This application is a continuation-in-part of my application Ser. No. 506,950, filed Sept. 18, 1974 now abandoned.

The invention relates to improvements in electrically cooking pieces of meat, such as fowl, or fish and other piece of food which have a central cavity.

Electric rotisseries are well known wherein fowl or other pieces of meat are supported on a rotating spit surrounded by a source of heat. Only a small part of the heat is effectively utilized and the rotation of the spit requires an entrainment mechanism unless the spit is turned manually.

To avoid heat losses and also the escape of smoke and odors emanating from the cooked meat, such pieces of meat are also cooked in closed ovens, with or without spits.

Other proposals have been made over the years for cooking pieces of food by placing them on a centrally heated spit. Such arrangements have been successfully used for cooking small items such as hot dogs and sausages, but all attempts to apply this principle to the cooking of larger pieces of food such as chickens have involved serious drawbacks. Firstly, cooking solely from the inside involves powerful heating leading to a burning of the inside, and undercooking of the outside. Most proposals have therefore been to only use the heated spit as a complement in a conventional oven with an additional heat source surrounding the piece of food being cooked. This merely increases the overall price without leading to any appreciable advantage. In one specific proposal (French Patent No. 1482608, Siemens, FIGS. 5, 6 and 7) a central spit heated along its entire length is surrounded by a perforated cylindrical sleeve with closed ends and which is spaced-apart from the spit. A chicken is placed on the sleeve, and the spit directly heats the chicken internally and may also produce an external circulation of air to heat it externally. Attempts to use such spits have however proven to be unsuccessful. To avoid a need for supplementary external heating means, the spit must still be heated to a degree producing an internal burning of the chicken. Furthermore, juices in the chicken tend to drop through the perforated sleeve onto the heating element and burn, causing disagreeable odors and producing a nasty burnt taste. And cleaning of the spit and its perforated sleeve is very difficult.

A primary object of the invention is therefore to provide a heated cooking spit which can be used to efficiently cook pieces of food such as chickens without the disadvantage of the previously proposed cooking spits.

In broad terms, the invention proposes a cooking spit of which only two end parts are heated, and which has a sleeve disposed about the central part of the spit, between the heating bodies, for supporting a fowl or another item to be cooked. In this manner, the fowl can be gently cooked from the interior without any fear of burning, by conduction of heat from the hot end parts of the spit to the relatively cooler central part of the spit and through the supporting sleeve, while at the same time providing an external cooking of the fown by a circulation of hot air about the exposed heated parts of the spit. In addition to supporting a fowl to be cooked, the sleeve protects the spit from droppings of grease or juice, and promotes the circulation of air through its open ends. The sleeve may conveniently be made removable to facilitate cleaning.

The spit may be sold in conjunction with specially adapted enclosures which need no other heating means to ensure an adequate internal and external cooking of fowl, or may be sold separately and used in any ad hoc container, such as a heat-resistant dish with a glass cover.

The above and other objects, advantages and features of the invention will become more apparent from the following description of preferred embodiments thereof, taken in conjunction with the accompanying drawings wherein:

FIG. 1 is a partial longitudinal section showing one embodiment of a broiler including a spit according to the invention;

FIG. 2 shows a detail of the embodiment of FIG. 1, on an enlarged scale;

FIG. 3 is a longitudinal section illustrating another embodiment of the present invention;

FIG. 4 shows a detail of the embodiment of FIG. 3, on an enlarged scale;

FIG. 5 is a top plan view of another embodiment of a spit; and

FIG. 6 is a view looking from above FIG. 5.

Referring now to the drawings and first to FIG. 1, there is shown a casing 1 of thin sheet metal, which constitutes the main housing portion of an oven or broiler for cooking a piece of meat. The casing 1 may be of rectangular or circular cross section and has a fixed wall 1a at one end thereof and a circular opening 2 at the opposite end. Opening 2 is defined by an inwardly extending flange 2a. A removable cover 3 is arranged over the opening 2 and has a cylindrical sleeve 4 frictionally fitting in flange 2a so that the cover 3 will be retained in closing position on the main housing portion of casing 1.

A spit 5 for supporting a piece of meat in the closed housing 1, 3 of the oven is integral with the displaceable cover which holds the spit immobile in the housing. The tubular metal spit comprises a rear rod portion 7 affixed to cover 3, a central portion about which is disposed a tubular sleeve 6 and an end portion 8 extending from sleeve 6 to a pointed end. Rod portion 7 has a collar 9 to which the cover is affixed and a heat-insulating handle 10 to enable the cover-spit assembly to be manipulated.

Electrical resistance heaters (not shown) are disposed in the rod portions 7 and 8, but (apart from connecting wires) do not extend through the central portion of the spit. The heaters are supplied by conductor wires 13 passing through portion 7 and connected to a power source (not shown) by means of a two-part connector shown in FIG. 2.

Connector 15 comprises male part 16 integral with displaceable cover 3 and including prongs 17 connected to wires 13. Female connector part 18 is integral with, or affixed to, main housing portion 1 and includes sockets 19 for receiving prongs 17 and connected to the power supply by terminals 21. Thus, when the cover 3 is placed into closing position in opening 2 of casing 1, the electric current supply circuit is closed. As soon as the cover is removed, heating is discontinued. A thermostat (not shown) may also be provided to switch off the heaters when a selected temperature is reached.

When the cover 3 is in position, spit end 8 is received and supported in a socket 22 carried by fixed wall 1a of the closed housing.

As indicated by chain-dotted lines in FIG. 1, it is simple to spit a fowl by piercing the carcass with the pointed end of the spit, and placing the fowl on the enlarged sleeve 6. Thus, the fowl will be centrally heated to broil it efficiently while it remains immobile in the oven, by conduction of heat along the central portions of the spit and through sleeve 6, whereas the fowl is cooked externally by a circulation of air about the heated portions 7 and 8 of the spit, as indicated by the arrows, and to some degree by reflection from the walls of housing 1. The oven housing construction may be very light, in contrast to conventional oven housings. For instance, the housing may be of glass so that the state of the piece of meat in the broiler may be readily observed from the outside through the transparent glass housing.

The oven has no moving parts and, since it is very light, it can be manufactured cheaply. Since its power requirements are low, due to the excellent utilization of the heat for inner and outer cooking, no special electric feed lines are needed.

FIGS. 3 and 4 illustrate another embodiment of the invention in a closed housing composed of two complementary half shells 30 and 31, one forming the bottom and the other one forming a displaceable cover of the oven housing. The bottom housing portion has brackets 34, 35 at opposite ends thereof for supporting spit 32 which comprises a hollow rod 36 and a tubular central sleeve 39. The pointed end of spit 32 is supported on bracket 34, and its other end adjacent a heat-insulating handle 40 is supported on bracket 35 and passes through an opening in the bottom housing portion.

As shown in FIG. 4, two heating bodies constituted by electric resistance heaters 37, 38 are mounted in the end parts of the axial bore of spit rod 36 and the central portion of the rod is surrounded by tubular sleeve 39 of a refractory material, such as ceramic or heat-resistant glass. The tubular sleeve is centered on the rod by radial spacers 41. Longitudinal channels 42 defined between the sleeve and the rod permit circulation of heated air between the rod and the sleeve.

The two electric resistance heating wires are thus disposed in the two end portions of the spit rod on respective sides of the central sleeve and thermostat 43 is provided on handle 40 to control the heat. In use, the two heated portions of spit rod 36 are located externally of a fowl, while the fowl is supported solely on the refractory sleeve which protect it from an excessive central heating.

The spits shown in FIGS. 5 and 6 comprises a hollow handle 51 of heat-insulating material enclosing supply leads and a timing device or thermostat. The handle 51 carries a hollow metal bar bent over into an elongated U-section to form two parallel arms 52, 53 enclosing electrical resistance heaters 54, 55 situated near handle 51 and two further heaters 56, 57 towards the bent-over end of the spit. Between the sections enclosing the heaters and about the two arms 52, 53 is mounted a tubular sleeve 58 of heat resistant material such as tempered glass, for example that available under the Trade Mark Pyrex. Sleeve 58 could be provided in another material such as a ceramic or even steel. Sleeve 58 has a slightly conical tapered end 58a, and is removably mounted on four spring arms 59, 60, 61 and 62 welded on arms 52, 53. Spring arms 59 and 60 are in the form of loops each directed obliquely to the respective arm of the spit in a forward direction towards the bent-over end, whereas spring arms 61, 62 are made in a single piece of general U-shape fixed centrally to arm 53 and the arms of which extend outwardly and rearwardly to bent over ends 61a, 62a respectively which serve as axial end stops for sleeve 58. The sleeve 58 can thus easily be placed on and removed from the spit at will, for the purpose of cleaning it and/or the spit arms. Detent means may be provided for positively holding the sleeve in its fitted position, while allowing easy removal.

As indicated in chain lines in FIG. 5, the rear end of the sleeve 58 may advantageously have a flange 58b acting as a stop to prevent a fowl mounted on the sleeve 58 from protruding over the heating bodies 52, 53.

Instead of the specific springs illustrated for removably supporting sleeve 58, other suitable spring means could be used, for example a spiral coil spring fitted at its ends to the spit arms.

The handle 51 of this spit could be provided with a cover such as that shown in FIGS. 1 and 2, for use in a special enclosure with a lateral opening closed by the cover.

The spit of FIGS. 5 and 6 could also be used in conjunction with a dish having a removable cover, as shown in FIG. 3. To facilitate use of the spit in ordinary dishes with a cover which are not specially designed to receive the spit, a part 63 of arms 52, 53 adjacent handle 51 may be flattened, as indicated in chain lines in FIG. 6, to improve fitting of the cover.

The length of sleeve 58 is such that it completely passes through medium and even large sized chickens. Hence, to place a fowl on the spit, the bent end of the spit is passed right through the central cavity of the fowl which is slipped onto sleeve 58, this operation being facilitated by tapered end 58a. The fowl is thus supported solely by the sleeve 58 whose open ends communicate with the air outside the fowl. The heating bodies 54 to 57 are hence also outside the fowl. This allows a circulation of air through sleeve 58 which ensures a quasi-uniform temperature gradient. It is not necessary that the enclosure in which the spit is placed acts as a heat reflector, although it may do so.

The central part of arms 52, 53 between the heaters is heated only by thermal conduction of the metal of the bar. The median part of the bar is thus at a substantially lower temperature than the end parts enclosing the heaters. In this manner, the spit simultaneously cooks the meat from inside and out, without a need for external heating means.

The spit is preferably used in the horizontal position so that the sleeve 58 not only prevents burning of the meat supported thereby, but also prevents grease and juices from dropping onto the spit and becoming burnt. consequently, the open-ended sleeve 58 should have no perforations in its wall.

Tests with the spit of FIGS. 5 and 6 have shown that it is possible to obtain a perfect cooking, even on a table in a dining room and in the company of guests, without any odor or burning smell such as accompanies usual grills.

The provision of a spit with two narrow arms as in FIGS. 5 and 6 has the advantage of permitting a better dissipation of the heat and a distribution of the heating bodies which allows the use of a relatively thin metal bar without a danger of destruction by overheating.

While the invention has been described hereinabove in connection with the broiling of fowl, it may be used with any other piece of meat placed on the tubular sleeve, or even fish, or fruits or vegetables capable of being placed on the tubular sleeve.

What is claimed is:

1. A cooking spit comprising:
an insulating handle;
a hollow elongated metal rod extending from the handle, said rod having first and second end parts and a central part;
heating bodies disposed in said first and second end parts of the hollow rod;
a non-perforated tubular sleeve having first and second open ends;
and means for supporting said tubular sleeve about said central part of the rod with said open first and second ends facing said first and second end part of the rod, said sleeve defining at least one longitudinal passageway about said central part of the rod.

2. A cooking spit according to claim 1, in combination with a closed housing for receiving the spit, said housing comprising a main housing portion defining an opening and a cover displaceably placed over said opening, said cover being fixed on the spit adjacent the handle to form an integral part of the spit.

3. A cooking spit according to claim 1, in combination with a closed housing for receiving the spit, said housing comprising a bottom part and a cover removably fittable on the bottom part, the bottom part including means for removably supporting the rod and defining a passageway through the housing for the rod.

4. A cooking spit according to claim 1, comprising spring means for removably mounting said sleeve about said central part of the rod.

5. A cooking spit according to claim 4, in which said spring means includes spring wires fixed to the rod, at least two of said spring wires having bent-over ends serving as an axial stop for the sleeve.

6. A cooking spit according to claim 1, in which said sleeve is of tempered glass.

7. A cooking spit according to claim 1, in which said hollow metal rod has two parallel arms formed from a single folded over tubular bar having two ends secured to said handle, each of said arms containing heating bodies in said first and second end parts of the rod.

8. A cooking spit comprising:
an insulating handle;
a hollow elongated metal rod extending from the handle, said rod having first and second end parts and a central part;
electric heating bodies disposed solely in said first and second end parts of the hollow rod;
a non-perforated open-ended tubular sleeve for passing through and supporting an item to be cooked;
means for removably supporting said tubular sleeve solely about said central part of the rod;
and conductor means for supplying electric current to said heating bodies to heat an item on said sleeve internally by conduction of heat along said central part of the rod and externally by circulation of air about said first and second end parts of the rod.

* * * * *